United States Patent [19]

Brown de Colstoun et al.

[11] Patent Number: 4,893,026
[45] Date of Patent: Jan. 9, 1990

[54] STATION FOR DETECTING AND LOCATING THROUGH LASER BEAMS AN OBJECT OR A SUBSTANCE LIKELY TO DIFFUSE BACK AT LEAST ONE PART OF THE INCIDENT LASER RAY AND SYSTEM FOR SENSING A SUBSTANCE SUCH AS SMOKE IN PARTICULAR OF A FIRE SUCH AS A FOREST FIRE

[76] Inventors: Francois Brown de Colstoun, 5755 E. River Rd., #2602, Tucson, Ariz. 85715; Jean-Paul Chambaret, 161 Avenue Paul Vaillant Couturier, 94250 Gentilly, France; Yves Chambaret, 77 Avenue Parmentier, 75011 Paris, France; Arnaud G. Le Saige de la Villesbrunne, 108 Boulevard de la Reine, 78000 Versailles, France; Jean-Claude M. Moscovici, 66 Avenue Victor Hugo, 75116 Paris, France

[21] Appl. No.: 162,871
[22] Filed: Mar. 2, 1988

Related U.S. Application Data

[63] Continuation-in-part of Ser. No. 947,892, Dec. 20, 1986, abandoned.

[30] Foreign Application Priority Data

Dec. 31, 1985 [FR] France ................. 85 19508

[51] Int. Cl.$^4$ ............................ G01H 15/06
[52] U.S. Cl. ................ 250/574; 340/630; 356/438
[58] Field of Search ............... 250/574-554; 340/578, 630; 356/5, 438, 439

[56] References Cited

U.S. PATENT DOCUMENTS

| | | | |
|---|---|---|---|
| 3,963,347 | 6/1976 | Segre et al. | 356/5 |
| 4,105,332 | 8/1978 | Hohne et al. | 356/5 |
| 4,197,006 | 4/1980 | Maillet | 356/5 |
| 4,654,518 | 3/1987 | Astheimer | 250/236 |

Primary Examiner—David C. Nelms
Assistant Examiner—Kholed Shami
Attorney, Agent, or Firm—Steinberg & Raskin

[57] ABSTRACT

A station for locating through laser rays an object likely to diffuse back a part of the incident laser ray, wherein the optical emitter and receiver devices consist of one single device comprising, in the direction of emission, a device for separating the emitted and retrodiffused rays, an optical device converting the emitted parallel beam of small diameter into a divergent beam and a telescope adapted to collimate the divergent beam received from the optical device into a parallel beam of larger diameter, the retrodiffused beam travelling that path in the direction reverse from the emitted beam, the invention being usable for detecting in particular forest fire smokes.

17 Claims, 2 Drawing Sheets

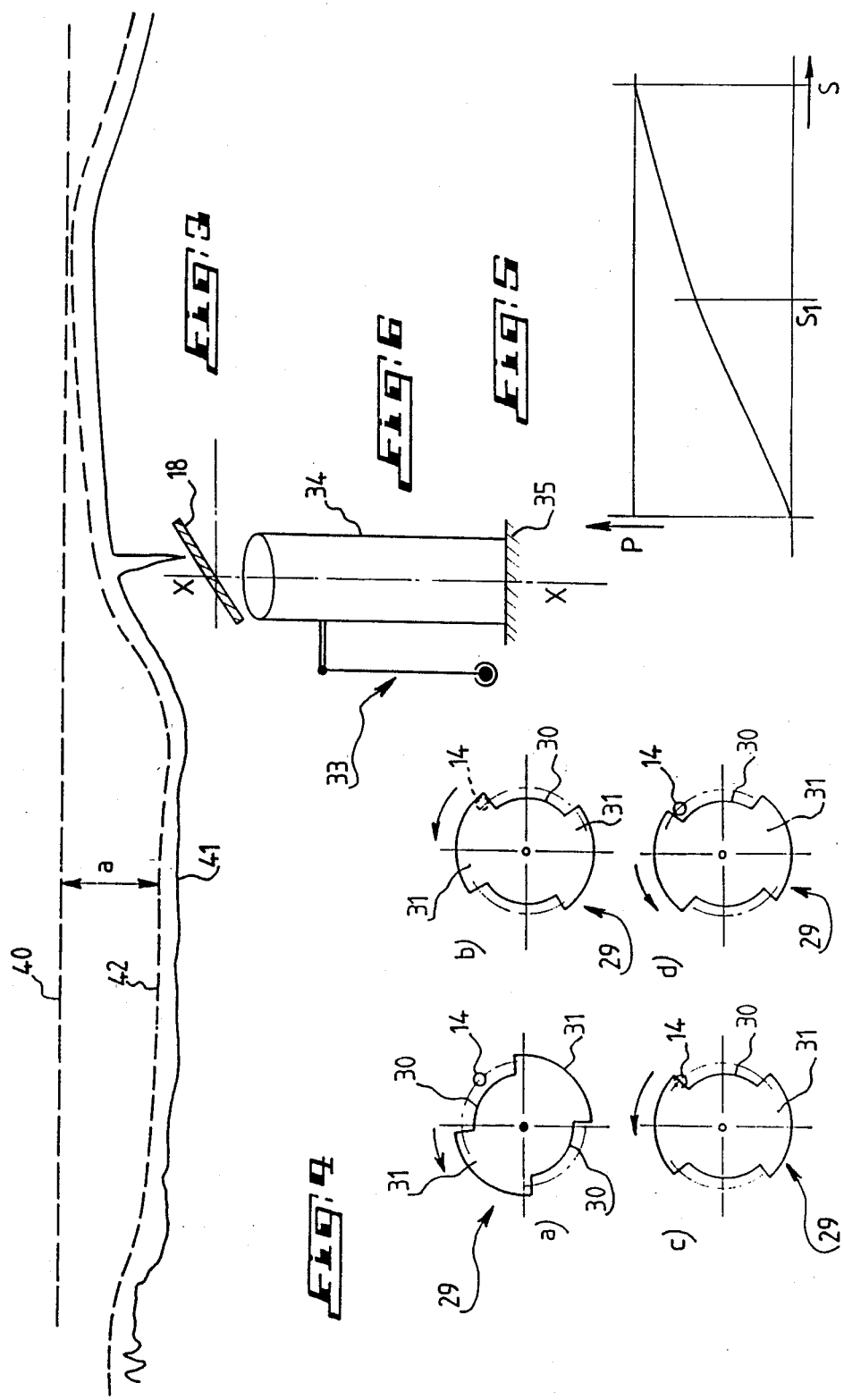

STATION FOR DETECTING AND LOCATING THROUGH LASER BEAMS AN OBJECT OR A SUBSTANCE LIKELY TO DIFFUSE BACK AT LEAST ONE PART OF THE INCIDENT LASER RAY AND SYSTEM FOR SENSING A SUBSTANCE SUCH AS SMOKE IN PARTICULAR OF A FIRE SUCH AS A FOREST FIRE

CROSS REFERENCE TO RELATED APPLICATIONS

This is a continuation-in-part application of Ser. No. 947,892 filed Dec. 20, 1986, now abandoned.

BACKGROUND OF THE INVENTION

The present invention relates to a station for detecting and locating through laser beams an object or a substance likely to diffuse back at least one part of the incident laser ray and to a system for sensing a substance such as smoke in particular of a fire such as a forest fire.

Stations of such a kind are already known which comprise a laser source emitting recurrent pulses, an optical emitter device and a retrodiffused rays optical receiving device as well as a device for determining the location of the object or the substance forming the origin of retrodiffused rays. These known stations suffer from the drawback that they exhibit a complex structure in particular in view of their optical emitter and receiver devices.

SUMMARY OF THE INVENTION

The present invention aims at coping with this inconvenience of the known stations.

To reach that aim, a station according to the present invention is characterized in that the optical emitter and receiver devices consist of one single device comprising, in the direction of emission, a device separating the retrodiffused emitted rays, an optical device converting the emitted parallel rays of small diameter into a divergent rays and a telescope adapted to collimate the divergent rays received from the optical device into a parallel beam of greater diameter, the retrodiffused rays travelling along that path in the reverse direction of the emitted rays.

According to an advantageous particular feature of the invention, the telescope comprises a first reflecting mirror of a relatively small size located in the path of travel of the laser rays downstream of the optical divergence device in the direction of the emission and inclined with respect to the axis of the emitted laser beam and a second mirror located in the axis of the beam sent back by the first mirror and adapted to collimate the reflected divergent beam into a parallel beam of a relatively large diameter.

According to another advantageous characterizing feature of the invention, the proposed station comprises an optical separator device such as a separator polarization cube located between the laser beam source and the optical divergence device and adapted to separate the retrodiffused beam from the emitted beam when the polarization of both beams are selected appropriately and to separate a small part of the emitted beam from the latter and a polarization variation device placed in the common path of travel of the emitted and retrodiffused beams for the purpose of their separation by the separator device.

According to still another advantageous characterizing feature, the station comprises a first detector for the detection of the small portion separated from the emitted beam and a second detector for the detection of the retrodiffused beam as well as a device for setting the time duration between the receiving by the first detector of the small portion of the emitted beam and the receiving by the second detector of the retrodiffused beam and for the determination of the distance of the retrodiffusing object from the emitter station by means of the said time duration.

According to still a further characterizing feature, the proposed station moreover comprises a plane reflecting mirror rotatably mounted in the aforesaid beam of great diameter and oriented so that the beam performs a motion of sweeping across an area to be watched. This mirror is arranged on a rotary platform or tray driven by a step-by-step motor.

As to the known systems for the detection of a substance such as smoke, in particular of forest fires, they comprise several watch towers each one fitted with an infrared radiation sensor which carries out a motion sweeping across the area to be watched. Upon the initiation of a forest fire, the first visible outbreak of this fire is the smoke column evolved therefrom and which rises above the trees. It is therefore the heat evolved from this smoke column which may be sensed by the scanning detectors of the watch towers.

Now, the temperature difference of a smoke at 30 m above the ground with respect to the ambient air on the one hand, and the emissive power thereof, on the other hand, are too small to obtain a significant signal at distances above a few kilometres. In addition to this inconvenience of an inadequate detectivity of fires, there also is the great inconvenience of the fact that several watch towers are required so that a fire may be located through a triangulation process for instance.

In order to cope with the drawbacks of the known systems which have just been described, the invention provides a system for the detection of a substance such in particular as the smoke of a fire, which is characterized in that it uses a station according to the present invention, i.e. a station for emitting a laser beam and for receiving the beam diffused back by the said substance and in that the diameter of the emitted beam is enlarged to such a value that the beam intensity be such that the laser light be not harmful to the human or animal eye and that the optical receiver device offers a large detectivity.

Thus, the invention provides an active system, i.e. emitting a laser beam and utilizing the beam diffused back or retrodiffused by a smoke instead of the passive systems of the state of the art which are based on the receiving alone of the infrared radiations emitted by the smoke columns.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting examples only illustrating several presently preferred embodiments of the invention and wherein:

FIG. 3 illustrates the way of scanning of the station according to the invention;

FIGS. 4a to 4d illustrate the working of an antidazzling device according to the invention;

FIG. 5 shows the correlation between the received retrodiffused laser beam part P over the distance s of the retrodiffused object from the station; and FIG. 6 is a schematical illustration of an angular support shift correction device.

DESCRIPTION OF THE PREFERRED EMBODIMENTS

Figure 1:
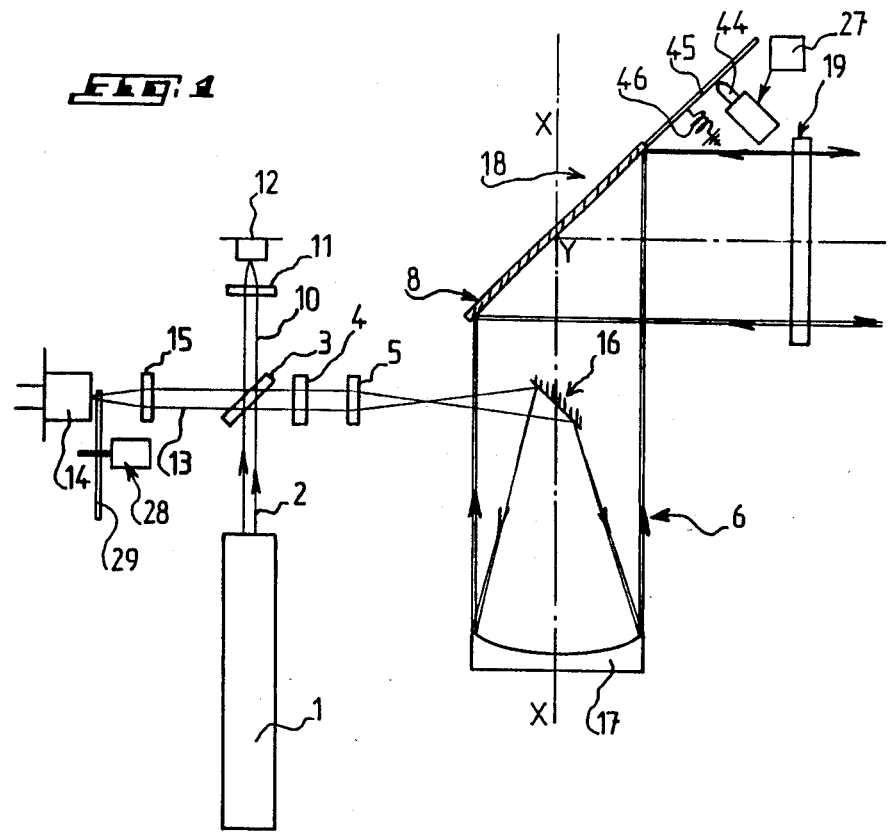
FIG. 1 diagrammatically shows the detecting station according to the present invention.

A detecting station or post provided by the invention essentially comprises, according to FIG. 1, a source 1 of a laser beam 2 of a relatively small diameter and within the path of travel of this emitted beam 2 a separator device 3 such as a separator strip or a polarizing separator cube, a polarization varing device 4; an optical device 5 such as a converging lens, a telescope 6 and an optical assembly 8 revolving about the axis X—X and adapted to direct the outgoing beam so that the latter sweeps across the area to be watched.

As shown by arrows, a beam retrodiffused by an obstacle lying in the path of travel of the beam emitted and received by the optical assembly 8 travels along the optical path just described from the optical assembly 8 to the separator device but in the direction reverse from that of the emitted beam 2.

The separator device is designed for separating from the emitted beam 2 a small beam portion 10 which reaches through a converging lens 11 a first detector 12 and for separating from the emitted beam 2 the retrodiffused beam designated by the reference numeral 13 and which is received by a second detector 14 through a converging lens 15. The station provided by the invention further comprises a local monitoring device 27 (FIG. 2) such as a mircoprocessor the function of which is to control, to organize and to steer the operation of the station according to the invention.

The telescope 6 consists essentially of a first plane reflecting mirror 16 located in that portion of the divergent beam which is produced by the converging lens 5 thereby forming a beam diverging device and of a second mirror 17 lying in the divergent beam sent back by the mirror 16 and shaped to collimate the divergent beam received into a parallel beam of a relatively great diameter. The mirror 16 is placed in the axis of the mirror 17 and exhibits a relatively small size with respect to the mirror 17. The parallel beam reaches the revolving optical assembly 8. The latter essentially comprises a plane reflecting mirror 18 and a protective window or shielding light diagrammatically designated at 19. The revolving assembly 8 is rotated by a step-by-step motor which is denoted at 20 on the diagram of FIG. 2 and controlled by a device 26.

Figure 2:
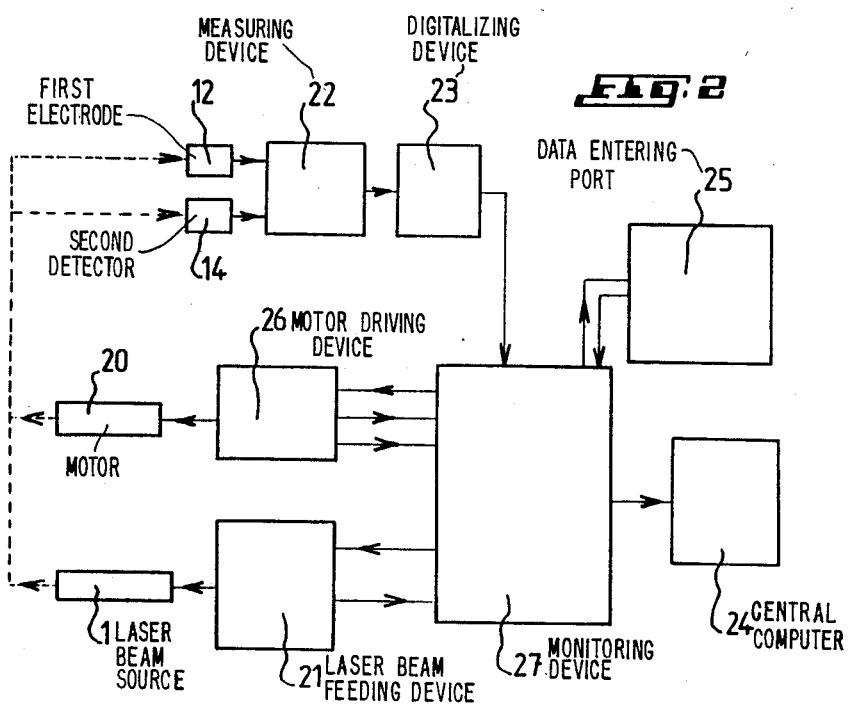
FIG. 2 is a block diagram showing the operation of a station and of a system provided by the invention.

The operation of a station according to the invention will be described hereinafter when used in a fire smoke detecting system such as the one shown diagrammatically in FIG. 2. In this connection will also be given by way of example the criteria and essential technical properties of the station and system which have to be compiled with or chosen for providing a good operation.

The laser source 1 emits a parallel beam 2 of relatively small diameter. This beam is converted into a parallel output beam with a relatively large diameter by means of the converging lens 5 and of the set of two mirrors 16 and 17. The revolving optical assembly 8 performs a circular step-by-step motion in order to sweep across the area or around the station above the trees. In each immovable or stationary angular position, the laser source emits one or several beam pulses under the control of the local monitoring device 27 which would send a shot order to the laser beam feeding device diagrammatically denoted at 21.

The detector 12 which receives a determined portion of the emitted laser beam 2 then triggers a chronometer which will be stopped by the detector 14 when the latter receives an echo as a retrodiffused beam. The time duration measured by the chronometer being directly proportional with the distance of the echo-producing obstacle from the station, this distance may be computed. The intensities of the light received by both sensors 12 and 14 are also measured. These various measures are carried out by the device diagrammatically denoted at 22. The measured values are digitalized by a device 23 and the data thus obtained are transmitted to the electronics of the local monitoring device 27. The flow of the various signals is indicated by arrowed lines.

The data relating to the light received by the sensor 12 which is in a determined known ratio to the power of the emitted beam 2, is taken into account within the central monitoring device as an operating reference of the laser beam. The central device 27 may thus monitor this laser beam.

The data relating to the retrodiffused light received by the sensor 14 are also taken into account within the central monitoring device 27. These data allow, on the one hand, to locate an object as a source of an echo and, on the other hand, to know the atmospheric visibility. In fact, within the central monitoring device 27 are indexed the stable objects such for instance as water towers or masts. Their position coordinates in the polar system provided by the device 27 as well as the power of the emitted beam 2 being known, the magnitude of their echo as determined by the detector 14 gives an information on the visibility of the atmosphere and allows obtaining information on the non-indexed obstacles such as a smoke column.

If an echo is detected which does not correspond to the presence of an obstacle or of an indexed smoke, the telemetered intensity and distance are taken into account by the device 27. If the magnitude of the echo is large, its position in polar coordinates and its distance are forthwith communicated to a central computer 24. If the intensity is low, the device 27 operates one or several other shots onto the same obstacle while maintaining the angular position of the scanning beam in order to confirm or to deny the presence of a smoke. In such a way, the taking into account of transitory objects such for instance as a bird in the scanning beam may also be discarded.

To provide for the good operation of a smoke detecting system according to the invention, a number of criteria and requirements should be taken into account. Thus, the wavelength of the light emitted by the laser source 1 should be selected according to several criteria: the atmosphere should be transparent for this wavelength. The latter should advantageously lie within the range invisible for the human eye in order to avoid especially by night the visual harmful or dazzling effects. The wavelength of the emitted light should be shorter than the size of the particles contained in the smoke (steam and unburnt solid products). The duration of the emitted pulses should be short to allow for an accurate telemetry. It should be recalled that light travels 30 cm within a period of time of one nanosecond ($10^{-9}$ s). Moreover, it is very important to choose the diameter of the emitted beam so that the light power density of this beam be below a safety threshold in operation, i.e. produce no harmful effect on the human eye.

By way of example, it is advantageous to use a laser of the YAG-Neodymium type emitting pulses with an energy lying between 10 and 300 millijoules at a wavelength $\lambda = 1.06\mu$ (approximating infrared light) of a duration of the order of 10 nanoseconds and at a recursive frequency of 5 to 30 Hertz.

In order that the smoke detection be reliable, the angle corresponding to one step of the revolving optical assembly 8 should be small enough, for instance of 0.16° or 2.8 milliradians. There are thus 2,250 analyzed positions. The revolving optical assembly 8 carries out a full horizon turn within 225 seconds. With a laser of the kind referred to hereinabove by way of example, it is possible to detect a smoke at a distance of 20 kilometers.

As to the central computer, it should be pointed out that it receives information from the various observation stations. It shows on a printer or on a screen the information useful to the user. It displays the location of the smokes sensed onto a transparency placed on a plotting board or like output table and would light on the wall map the box corresponding to the location of the transparency. The user, by placing the transparency onto the map thus accurately determines the location of the smoke.

To still improve the efficiency or effectiveness and the reliability of the system according to the invention, the device 21 for feeding the laser source 1 and the device 26 for driving the motor 20 may converse with the central device 27 as shown in arrowed lines. Thus, the driving device may confirm to the device 27 that a motion ordered by the latter has been carried out. The feed device 21 may convey to the device 27 information relating to its good working.

The station such as described until now, with its optical assembly 8 rotating about the vertical axis X—X, sweeps or scans the region to be controlled in e.g. horizontal reference plane illustrated on FIG. 3 by the horizontal scan line 40. However, in regions where the ground is uneven so that the sky line seen from the detecting station is the one illustrated by line 41 on the FIG. 3, the smoke caused by a forest fire located in a valley may be partially or even wholly dissipated by wind before reaching the scan plane 41.

For adapting the station proposed by the invention to regions with uneven ground and an uneven sky line such as the line 41, the rotating optical assembly 8 is caused to accomplish a scanning movement according to line 42 which follows the sky line 40 in the manner of an envelope line at a distance chosen to ensure optimal fire detection conditions.

For enabling the rotating optical assembly 8 to sweep or scan according to line 42, the plane reflecting mirror 18 additionally to its rotational movement about the vertical axis X—X is adapted to accomplish a pivotal movement about a horizontal axis Y. The vertical mirror movement driving means comprises a pushing member 44 acting on an arm-like member 45 secured to the mirror 18 at the periphery thereof and a biasing spring member 46. The pushing member 44 may be the rod of a solenoid which receives control signals from the local monitoring device 27 shown on FIG. 2 which is programmed to produce for each angular position corresponding to one step of the revolving optical assembly 8 a signal corresponding to the vertical distance a between the scan line 42 and the horizontal line 41 on FIG. 3. This distance a specific for each angular position of the revolving assembly 8 with its mirror 18 is part of the program controlling the detecting and locating station.

However the detector system will be located at the top of a support structure such as a high tower. This support structure will not be absolutely stationary and may be inclined under the effect of wind or thermal stresses due to external heating that may not be uniform around it, such as for instance heating by sun radiation. In such a case, the rotative axis X—X will be shifted from its vertical orientation and the rotating mirror 18 will no longer scan along the line 42 of FIG. 3.

For avoiding such errors, the detector system will be provided with a pendulum device comprising two pendulum inclinometers effective in two perpendicular vertical planes. The FIG. 6 shows in 33 one of such pendulum means associated to an envelope member 34 secured to the support structure 36 and including the detector system having the rotative axis X—X. The pendulum inclinometers 33 may be of any known type in view to establish any angular shift of the axis X—X from the vertical direction. The value of the angular shift will be supplied for instance to the monitoring device 27 programmed to correct the value a in accordance to the angular shift. Thus correct working of the station proposed by the invention is ensured.

This station according to the invention is further provided with means for avoiding dazzling of the optical device which may be caused by a smoke column present at a relatively small distance from the detector station.

For this purpose, a generally circular shaped rotative disc 29 driven by a device shown in 28 is provided which extends by its peripheral portion in the retrodiffused laser beam 13 between the separator device 3 and the second detector 14, for instance immediately in front of the latter, such as shown on the FIG. 1.

As results from the FIG. 4, this rotatable disc 29 presents at its periphery diametrically opposed and symmetrically with respect to the disc center two cutouts 30 the bottom of which has the shape of a circle portion and which extend over a predetermined peripheral length.

This disc 20 is placed in a way to intercept the retrodiffused beam by its portion 31 between the two cutouts and to allow the passage of the laser beam to the detector 14 through one of these cutouts, in accordance to the angular position of the rotatable disc. The FIG. 4a shows the latter in an angular position where the detector 14 receives the retrodiffused beam 13. On FIG. 4b, this beam cannot pass to the detector. The rotatable disc is shaped and driven in a way to prevent a dazzling of the detector 14 at the moment of the emission of the laser signal by a too near object and to establish a substantially linear correlation between the retrodiffused laser beam portion which is received by the detector 14 in function of the distance of a retrodiffusion producing smoke column from the detector station. This correlation is shown on FIG. 5. It is to be noted that only a small part of the retrodiffused laser beam 13 will be received by the detector 14 when the smoke column is relatively near to the station. This result is illustrated by the FIGS. 4b to 4d. The FIG. 4b shows the angular position of the disc 29 with respect to the detector 14 at the instant of the emission of a laser beam signal, the disc being considered to rotate in the direction indicated by the arrow. In this position, the receiver 14 is just covered by a beam intercepting disc portion 31. The FIG. 4c shows the angular position of the disc 29 with respect to the receiver 14 which corresponds to a retrodiffusion of the emitted laser beam by a smoke column situated at a mean distance $s_1$ from the detector station, of for instance 10 kilometers for a maximum detection distance of for instance 20 kilometers. In its position according to FIG. 4c, only half of the retrodiffused beam 13 will be received by the receiver 14. On FIG. 4d, the receiver 14 is completely uncovered and all retrodiffused laser light of beam 13 will be received. This angular position of the disc 29 corresponds to far away located smoke columns. It results from the Figures that, by progressively uncovering the detector 14, the fire detector and locating station works with the same efficiency and precision independently from the distance of the smoke column from the station. This particularity of the invention is based upon the discovery that for detecting and locating a fire relatively near to the station only a relatively small part of the retrodiffused laser beam is necessary for the fire detection and that the reception of the entire reflected laser beam 13 would produce a dazzling of the detector and, accordingly, of the station.

In order to obtain good working conditions, the disc 29 may have a diameter of 20 centimeters and rotate at a speed of 6000 rotations per minute when a laser beam signal is emitted any 70 milliseconds.

It appears from the foregoing remarks that a station designed according to the present invention allows to emit a laser beam of a substantial diameter which may be selected according to the requirements of use of the station. In a smoke detecting system, the diameter should be chosen such that the light intensity of the beam be not inconvenient or harmful to the human eye. Moreover, a great diameter provides for a great detectivity of the optical receiver system. The fact that, according to the invention, the optical emitter device and the optical receiver device consist of one and a same device substantially simplifies the construction of the station and makes same cheap and very reliable. Owing to the specific utilization described hereinabove of the detectors 12 and 14 and to the provision of indexes of those obstacles which should not be stored within the local monitoring device, it is possible to permanently get an information about the proper operation of the laser source, the atmospheric conditions and the nature of the obstacles forming sources of echoes. To still improve the system, the local monitoring device 27 may talk with the central computer and with a post shown at 25 which may enter new data into the device 27 or confirm some data produced by this device with a view to permanently update the index, for instance, and to allow to check or verify the nature of certain non-indexed echoes such for instance as transitory smokes which have to be tolerated but which, however, should not cause an alarm to be released. Moreover, the localization of a smoke may be carried out by one single station.

What is claimed is:

1. A station for detecting and locating through laser rays an obstacle such as an object or a substance likely to retrodiffuse at least one part of an incident laser ray, in particular fire smoke such as forest fire smoke, comprising a laser source emitting recurrent pulses, an optical device through which rays emitted and retrodiffused travel and provided with a device for separating emitted and retrodiffused rays and a device for enlarging and reducing the diameter of parallel beams as the beams are admitted or retrodiffused, wherein the optical device comprises a revolving optical assembly rotatably arranged within the beam travel path portion of larger diameter and oriented such that the emitted laser beams perform a predetermined sweeping motion, the revolving optical assembly being driven by a step-by-step motor, and wherein a data processing device is provided which includes memory means in which data are stored for each angular position of the revolving optical device corresponding to one step thereof, which are representative of distance of a location of a zone to be controlled from a reference scan plane, and a control device is provided for pivoting the optical assembly about a horizontal axis to enable the assembly to sweep said location in response to a control signal developed by said control device from the said stored data.

2. A station according to claim 1, wherein a rotating retrodiffused laser beam intercepting disc is provided which is situated in front of a retrodiffused laser beam receiver and comprises circumferentially arranged laser beam passageways in said disc, and angular movement of said disc with respect to an instant of emission of a laser pulse being chosen in a manner such that a respective passageway at an instant of reception of the retrodiffused laser pulse following said laser pulse emission uncovers said receiver more or less depending upon whether the location where the retrodiffusion has been produced is more or less distant from the receiver.

3. A station according to claim 1, wherein said optical device comprises a separator device consisting of a polarizing separator cube located between the laser beam source and the device for transforming the laser beam diameter and adapted to separate the retrodiffused beam from the emitted beam when the polarizations of both beams are suitably selected and to separate a small portion from the emitted beam.

4. A station according to claim 3, comprising a detector for sensing the small beam portion separated from said emitted beam and a second detector for sensing the retrodiffused beam as well as a device for setting the time duration between the receiving of the small beam portion by the first detector and the receiving of the retrodiffused beam by the second detector and for the determination of the distance of the object forming the source of the retrodiffused beam.

5. A station according to claim 4, wherein said control device such as a microprocessor adapted to determine by means of the portion separated from the emitted beam received by said first detector the power emitted by the laser source and for monitoring the good operation thereof.

6. A station according to claim 5, wherein said control device is adapted to control the step-by-step motor and the emission of laser pulse at each angular position of said revolving optical device.

7. A station according to claim 5, wherein said control device is adapted to control the stop of said motor and the emission of several laser pulses in accordance with the magnitude of the retrodiffused beam received.

8. A station according to claim 1, wherein said device for transforming the diameter of the laser beam is likely to produce a beam the diameter of which is enlarged to such a value that the beam intensity is such that the laser light is not harmful to the human eye.

9. A station according to claim 5, wherein the control device comprises an index of stable objects the retrodiffused beams of which should not release an alarm and which is adapted to use these retrodiffused beams as a reference for determining the atmospheric visibility and the nature of the retrodiffusing object.

10. A station according to claim 9, wherein the laser source is of the YAG-Neodymium type emitting energy pulses ranging from 10 to 300 millijoules with a wavelength of about 1.06 microns for a duration of about 10 nanoseconds.

11. A station according to claim 1, wherein the device for transforming the laser beam diameter comprises a device converting the parallel beam of small diameter emitted by said laser source into a divergent beam and a telescope adapted to collimate the divergent beam received from the optical divergence device into a parallel beam of larger diameter.

12. A station according to claim 11, wherein said telescope comprises a first reflecting mirror of a relatively small size located within the path of travel of the laser beam downstream of the optical divergence device in the direction of emission and a second mirror located in the axis of the beam reflected by the first mirror and adapted to collimate the divergent beam into a parallel beam of a relatively great diameter.

13. A station according to claim 12, wherein said revolving optical assembly comprises a plane reflecting mirror rotatably mounted within the beam exhibiting an enlarged diameter.

14. A station according to claim 1, wherein said optical assembly pivoting device comprises a push member such and biasing means, such push member and said biasing means acting on an arm member secured to the reflecting mirror of the optical assembly at the periphery of the mirror.

15. A station according to claim 14, located at the top of a support structure such as a high tower, wherein a device for measuring angular shifts of the support structure from its vertical orientation is provided and said control device is provided with means for correcting the pivoting about the horizontal axis of the reflecting mirror due to the measured angular shift.

16. The station of claim 14, wherein said push member is a rod of a solenoid electrically coupled to said data processing device and said biasing device means is spring means.

17. A station for detecting and locating through laser rays an obstacle such as an object or a substance likely to retrodiffuse at least one part of an incident laser ray, in particular fire smoke such as forest fire smoke, comprising a laser source emitting recurrent pulses, an optical device through which rays emitted and retrodiffused travel and provided with a device for separating emitted and retrodiffused rays and a device for enlarging and reducing the diameter of parallel beams as the beams are admitted or retrodiffused, wherein the optical device comprises a revolving optical assembly rotatably arranged within the beam travel path portion of larger diameter and oriented such that the emitted laser beams perform a predetermined sweeping motion, the revolving optical assembly being driven by a step-by-step motor, and wherein a rotating retrodiffused laser beam intercepting disc is provided which is situated in front of a retrodiffused laser beam receiver, and comprises circumferentially arranged laser beam passageways in said disc, angular movement of said disc with respect to an instant of emission of a laser pulse being chosen in such a way that a respective passageway at the instant of reception of the retrodiffused laser pulse following said laser pulse emission uncovers said receiver more or less depending upon whether the location where the retrodiffusion has been produced is more or less distant from the receiver.

* * * * *